(12) United States Patent
Lau et al.

(10) Patent No.: US 10,443,688 B2
(45) Date of Patent: Oct. 15, 2019

(54) DRIVING DEVICE HAVING MOTOR AND GEARBOX

(71) Applicant: Johnson Electric S.A., Murten (CH)

(72) Inventors: James Ching Sik Lau, Hong Kong (CN); Jing Ning Ta, Hong Kong (CN); Qiu Mei Li, Shenzhen (CN); Bin Yu, Shenzhen (CN)

(73) Assignee: Johnson Electric International AG, Murten (CH)

( * ) Notice: Subject to any disclaimer, the term of this patent is extended or adjusted under 35 U.S.C. 154(b) by 161 days.

(21) Appl. No.: 15/442,191

(22) Filed: Feb. 24, 2017

(65) Prior Publication Data

US 2017/0254389 A1 Sep. 7, 2017

(30) Foreign Application Priority Data

Mar. 4, 2016 (CN) .......................... 2016 1 0124916

(51) Int. Cl.
| | | |
|---|---|---|
| *F16H 57/027* | (2012.01) | |
| *F16H 1/28* | (2006.01) | |
| *F16H 1/46* | (2006.01) | |
| *F16H 57/04* | (2010.01) | |
| *F16H 57/08* | (2006.01) | |
| *F16H 57/02* | (2012.01) | |
| *H02K 5/20* | (2006.01) | |
| *H02K 7/116* | (2006.01) | |
| *H02K 9/06* | (2006.01) | |

(52) U.S. Cl.
CPC ............ *F16H 1/2836* (2013.01); *F16H 1/46* (2013.01); *F16H 57/027* (2013.01); *F16H 57/0416* (2013.01); *F16H 57/0486* (2013.01); *F16H 57/08* (2013.01); *F16H 57/082* (2013.01); *F16H 2057/02034* (2013.01); *H02K 5/20* (2013.01); *H02K 7/116* (2013.01); *H02K 9/06* (2013.01)

(58) Field of Classification Search
CPC .. F16H 1/2836; F16H 57/082; F16H 57/0486; F16H 57/08; F16H 1/46; F16H 2057/02034; F16H 57/027; F16H 57/0416; H02K 7/116; H02K 5/20; H02K 9/06

See application file for complete search history.

(56) References Cited

U.S. PATENT DOCUMENTS

| 6,461,265 B1 * | 10/2002 | Graham | ................. F16H 3/724 475/5 |
|---|---|---|---|
| 8,075,439 B2 * | 12/2011 | Ta | .......................... A47K 13/10 192/56.1 |
| 2009/0221396 A1 * | 9/2009 | Berg | ........................ F16H 1/28 475/331 |

* cited by examiner

*Primary Examiner* — Jacob S. Scott
*Assistant Examiner* — Lillian T Nguyen
(74) *Attorney, Agent, or Firm* — Muncy, Geissler, Olds & Lowe, P.C.

(57) ABSTRACT

A driving device includes a motor and a gearbox. The gearbox includes a first sun gear, first planetary gears surrounding and engaged with the first sun gear, and a first internal gear ring surrounding and engaged with the first planetary gears. The first sun gear is coaxially fixed to a rotary shaft of the motor. Meshing planes of the first sun gear and the first planetary gears are slanted with respect to the rotary shaft. Each of the first planetary gears is subjected to an externally-exerted first force and exerts a transverse component of force toward the rotary shaft on the first sun gear. The motor structure of the driving device is simplified, which makes the driving device have a more compact structure, lighter weight and lower cost.

19 Claims, 9 Drawing Sheets

DRIVING DEVICE HAVING MOTOR AND GEARBOX

CROSS REFERENCE TO RELATED APPLICATIONS

This non-provisional patent application claims priority under 35 U.S.C. § 119(a) from Patent Application No. 201610124916.7 filed in The People's Republic of China on Mar. 4, 2016.

FIELD OF THE INVENTION

The present invention relates to a driving device, and in particular to a driving device including a motor and a gearbox.

BACKGROUND OF THE INVENTION

Gearboxes are commonly used to reduce speed of motor output before outputting to the outside. The gearbox and the motor are typically mounted together as a driving device. There is a desire for a driving device having a more compact structure and/or lighter weight.

SUMMARY OF THE INVENTION

Thus, there is a desire for a driving device having a more compact structure and/or lighter weight.

A driving device is provided which includes a motor and a gearbox. The gearbox includes a first sun gear, a plurality of first planetary gears surrounding and engaged with the first sun gear, and a first internal gear ring surrounding and engaged with the plurality of first planetary gears. The first sun gear is fixedly connected to a rotary shaft of the motor for coaxial rotation along with the rotary shaft. Meshing planes of the first sun gear and the first planetary gears are slanted with respect to the rotary shaft. The first planetary gears are spaced from each other along a circumferential direction of the first sun gear and are each subjected to an externally-exerted first force, thereby making each of the first planetary gears exert a transverse component of force toward the rotary shaft on the first sun gear.

Preferably, the first planetary gears are equidistantly spaced along a circumferential direction of the first sun gear, and the transverse components of force that the first planetary gears respectively exert on the first sun gear toward the rotary shaft are equal in size.

Preferably, the transverse component of force that each of the first planetary gears exerts on the first sun gear points to an axis of the rotary shaft.

Preferably, the number of the first planetary gears is three.

Preferably, the first planetary gears are rotatably mounted to a first planetary carrier, the first planetary carrier is subjected to a second force that a first resilient member exerts toward the motor, and the first planetary carrier exerts the first force on the first planetary gears.

Preferably, the first resilient member is a compression spring, and at least one end of the compression spring is mounted with a rolling ball.

Preferably, a second resilient member is mounted between each of the first planetary gears and the first planetary carrier and is configured to generate a force acting on the first planetary gears.

Preferably, the first planetary gears are rotatably mounted to a first planetary carrier, and a second resilient member is mounted between each of the first planetary gears and the first planetary carrier and is configured to generate the first force acting on the first planetary gears.

Preferably, the rotary shaft is supported only by a bearing and the first sun gear, and the bearing is mounted at one end of the motor away from the gearbox.

Preferably, teeth of the first sun gear have a thickness progressively increasing in a direction close to the motor to thereby cause the meshing plane of the first sun gear to be slanted with respect to the rotary shaft. Teeth of the first planetary gears have a thickness progressively decreasing in a direction close to the motor. Teeth of the first internal ring gear have a thickness progressively increasing in a direction close to the motor.

Preferably, the gearbox further comprises a second sun gear, a plurality of second planetary gears surrounding and engaged with the second sun gear, and a second internal gear ring surrounding and engaging with the second planetary gears, the second sun gear is coaxially fixed to the first planetary carrier, the second planetary gears are rotatably mounted to a second planetary carrier, and an output shaft of the gear box is coaxially fixed to the second planetary carrier.

Preferably, the first resilient member is a compression spring and is mounted between the second sun gear and one of the output shaft and second planetary carrier.

Preferably, the driving device further comprises a fan fixedly attached around the rotary shaft and located between the motor and the gearbox.

Preferably, the fan comprises a hub attached around the rotary shaft, a plurality of blades connected to the hub, and a panel connected to the blades. The panel is substantially perpendicular to the rotary shaft and located between the blades and the gearbox.

Preferably, the fan comprises a hub attached around the rotary shaft and a plurality of blades connected to the hub. The rotary shaft is mounted to a rotor core, and the rotor core and the hub are connected together via a protrusion-groove engagement structure.

Preferably, the protrusion-groove engagement structure is formed by a plurality of protrusions formed on the hub and a plurality of grooves defined in the rotor core.

Preferably, the driving device further comprises a ventilation housing. The ventilation housing surrounds an outer side of the fan and is fixed to an outer housing of the gearbox, and the ventilation housing defines a ventilation opening.

Preferably, the ventilation housing and the outer housing of the gearbox are fixed together through an axial pin or screw.

Preferably, the ventilation housing and the outer housing of the gearbox are fixed to the motor through an axial pin.

Preferably, the ventilation housing includes a rib formed on an outer periphery thereof, the outer housing of the gearbox also includes a rib formed on an outer periphery thereof, the rib of the ventilation housing and the rib of the outer housing are aligned with each other, and the rib of the ventilation housing and the rib of the outer housing are each formed with a through hole for insertion of the pin or screw therethrough.

Preferably, the second force exerted by the first resilient member is in the range of 7.5 N to 18 N.

Preferably, the first sun gear has a tooth thickness of 3 to 5 mm, and the meshing plane is inclined 3 to 8 degrees with respect to the rotary shaft.

In comparison with the prior art, preferred embodiments of the present invention have the following advantages: by designing the structure of the teeth of the first sun gear, the first planetary gears and the first internal gear ring, the meshing planes of the first sun gear and the first planetary gears are slanted with respect to the rotary shaft, and the first planetary gears are subjected to the first force toward the motor. Therefore, the first planetary gears respectively exert the transverse components of force toward the rotary shaft on the first sun gear to reduce a radial gap between the first planetary gears and the first sun gear, thus supporting the sun gear and the rotary shaft like a bearing. As such, two ends of the rotary shaft can be supported by the first sun gear and a bearing, respectively. In comparison with the traditional motor which requires two bearings to support the rotary shaft, the motor of this invention can simplify the motor structure and reduce the axial size, which makes the driving device have a more compact structure, lighter weight and lower cost.

BRIEF DESCRIPTION OF THE DRAWINGS

Advantages and features of the present invention will become more apparent by considering the following description of embodiments of the invention with reference to the accompanying drawings. It is noted that the drawings are for the purposes of illustration only and should not be regarded as limiting.

DETAILED DESCRIPTION OF THE PREFERRED EMBODIMENTS

Figure 1:
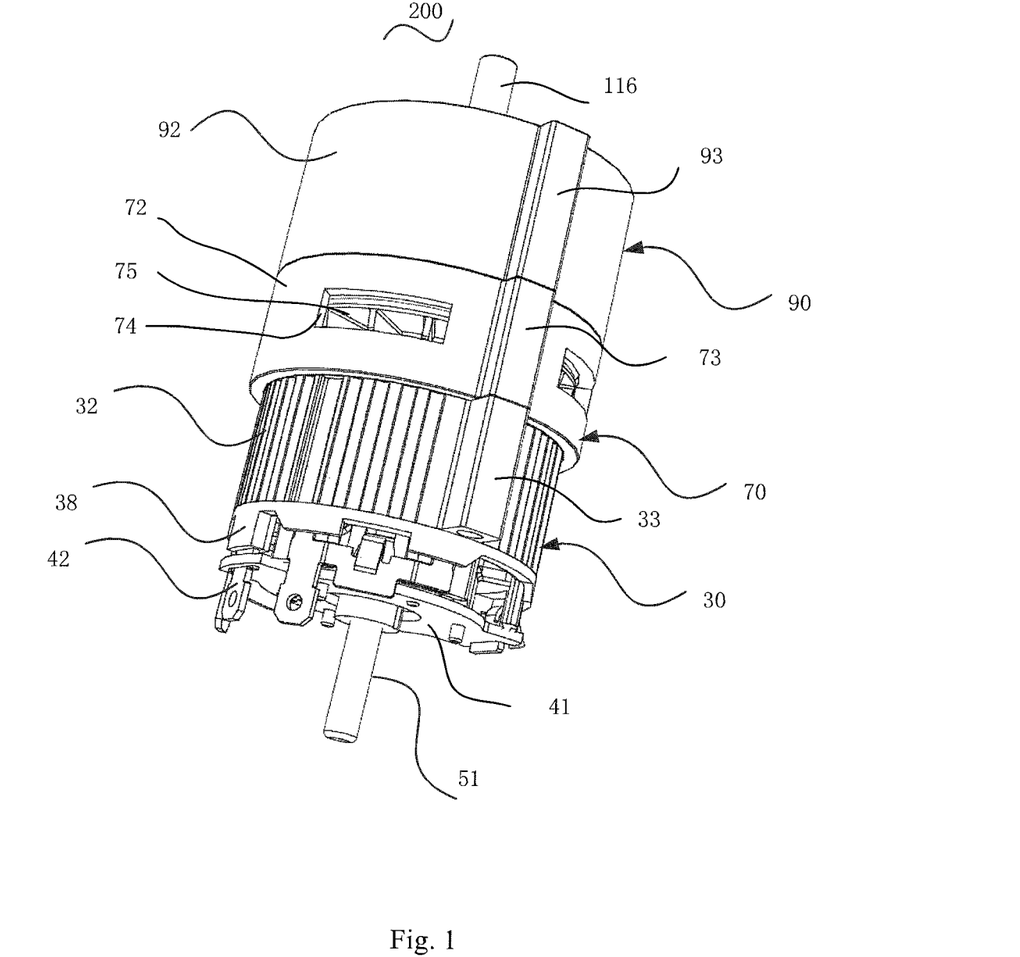
FIG. 1 illustrates a driving device according to one embodiment of the present invention.
Figure 2:
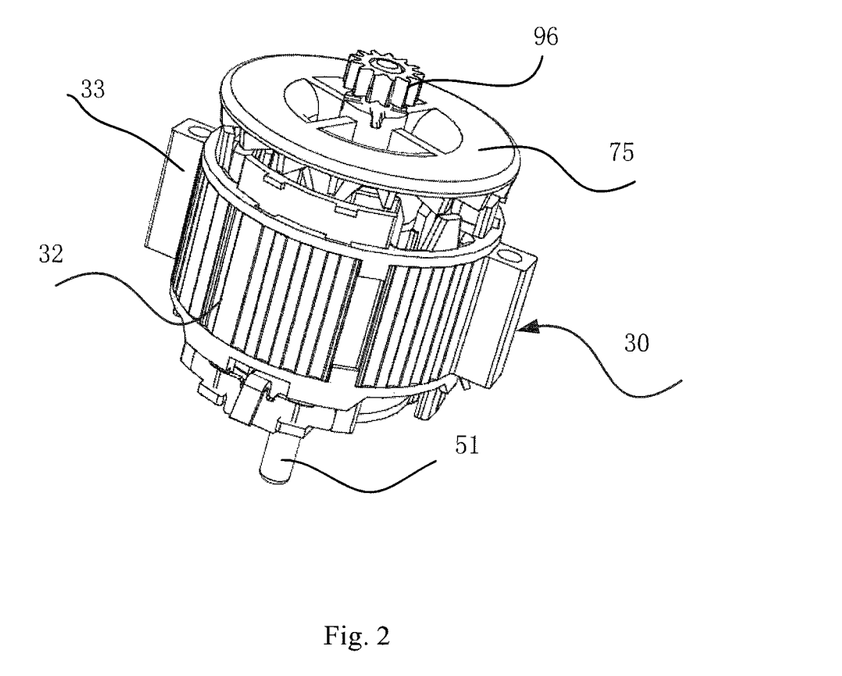
FIG. 2 illustrates a motor assembly used in the driving device of FIG. 1.
Figure 3:
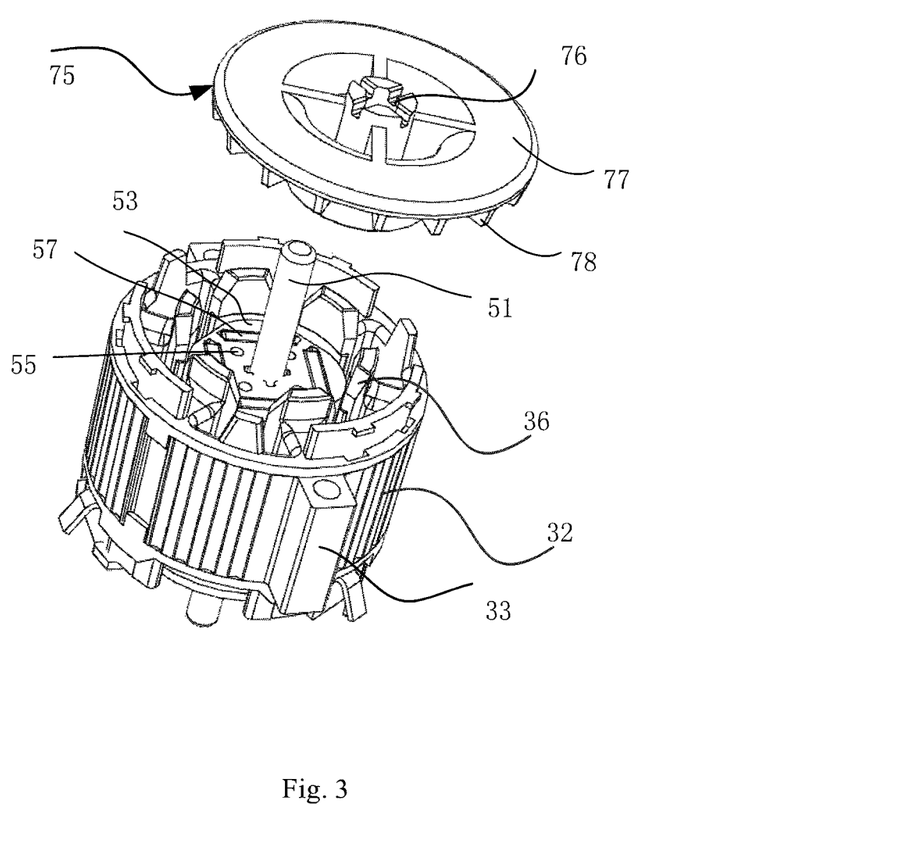
FIG. 3 and FIG. 4 are exploded views of the motor assembly of FIG. 2, viewed from different aspects.
Figure 4:
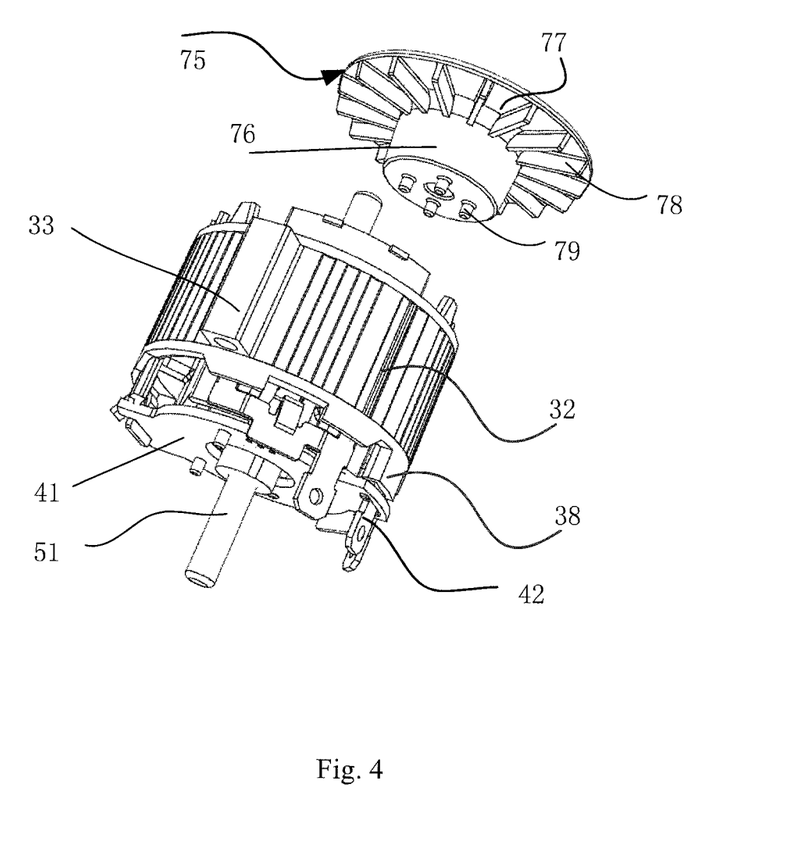

Referring to FIG. 1, the driving device 200 of this invention includes a motor 30 and a gearbox 90. The gearbox 90 is mounted to an output end of the motor 30 to reduce an output speed of the motor 30 and then output to the outside through an output end of the gearbox such as an output shaft 116.

Referring to FIG. 1 to FIG. 4, the motor 30 includes a stator and a rotor. The stator includes a stator core 32, an end cap 38 mounted to one end of the stator core 32, a circuit board 41 mounted to an outside of the end cap 38, and terminals 42 mounted to the end cap 38. The stator core 32 includes an annular yoke, and a plurality of teeth extending inwardly from the yoke. Winding slots are formed between adjacent teeth. The rotor includes a rotor core 53 fixed to a rotary shaft 51, and permanent magnets 57 mounted to the rotor core 53. The rotor core 53 and the stator core 32 define a gap therebetween which permits the rotor to rotate relative to the stator.

In this embodiment, a fan 75 is further fixedly mounted to the rotary shaft 51. The fan 75 is located between the motor 30 and the gearbox 90. The fan 75 includes a hub 76 attached around the rotary shaft 51, a plurality of blades 78 connected to the hub 76, and a panel 77 connected to the blades 78. The panel 77 is substantially perpendicular to the rotary shaft 51 and located between the blades 78 and the gearbox 90. The hub 76 and the rotor core 53 are connected together through a protrusion-groove engagement structure. The protrusion-groove engagement structure is formed by a plurality of protrusions 79 formed on the hub 76 and a plurality of grooves 55 defined in the rotor core 53.

Figure 5:
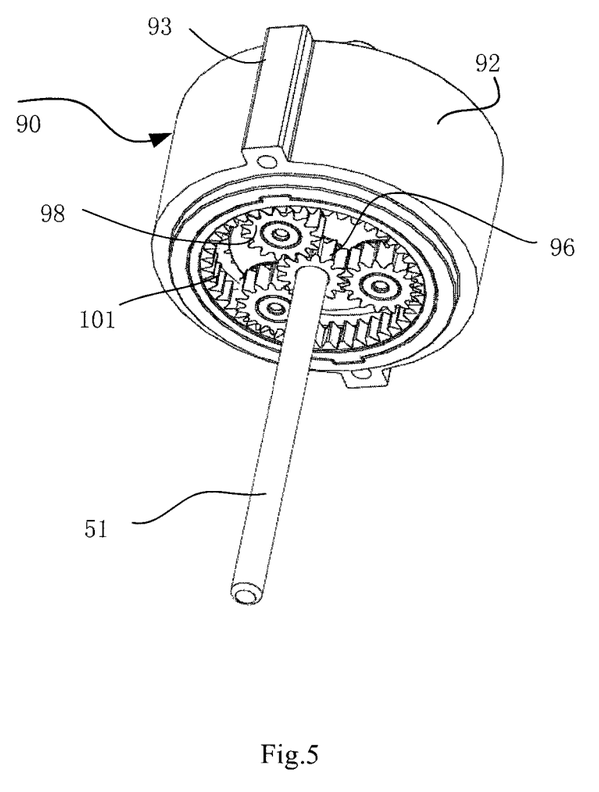
FIG. 5 illustrates a gearbox used in the driving device of FIG. 1.
Figure 6:
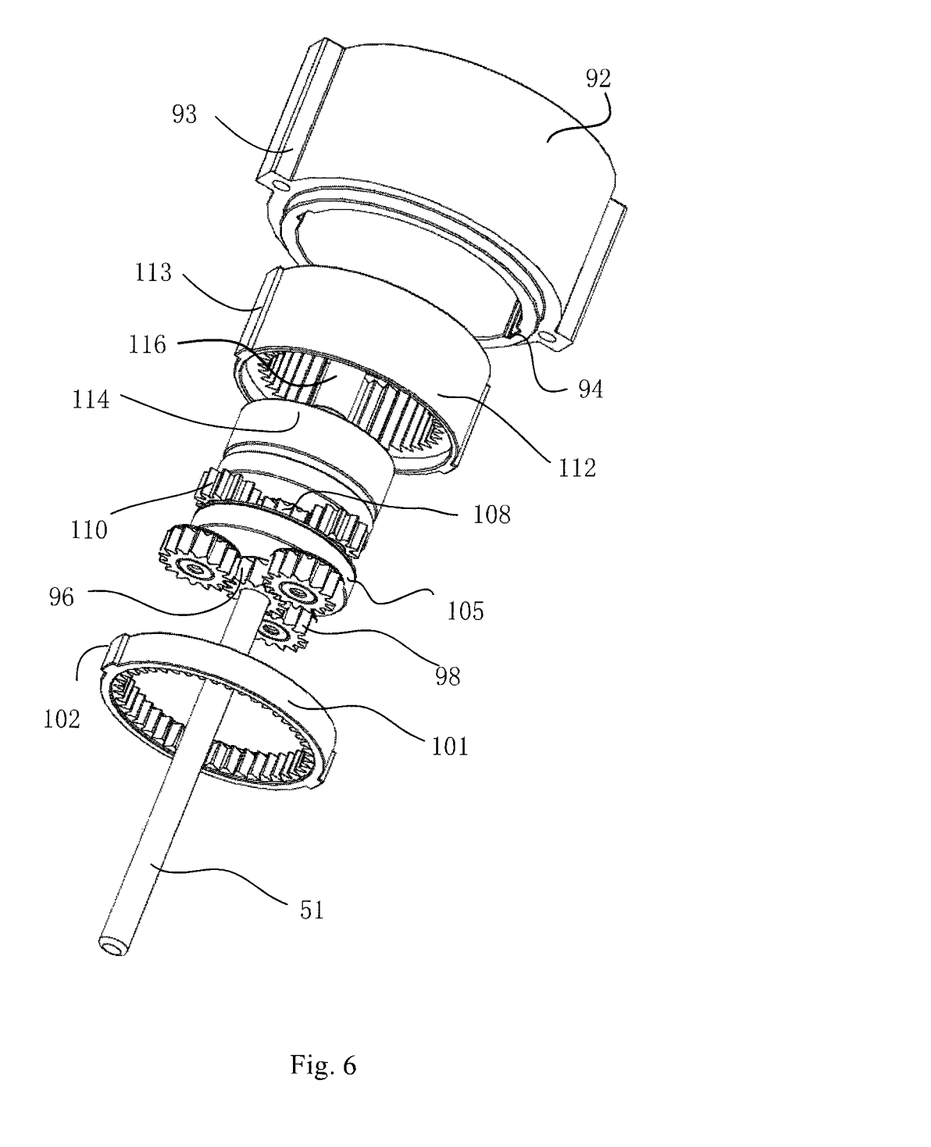
FIG. 6 is an exploded view of the gearbox of FIG. 5.

Referring to FIG. 5 and FIG. 6, the gearbox 90 includes a two-stage planetary gear train. The two-stage planetary gear train includes a first stage planetary gear train and a second stage planetary gear train. The first stage planetary gear train includes a first sun gear 96, a plurality of first planetary gears 98 surrounding and engaged with the first sun gear 96, and a first internal gear ring 101 surrounding the plurality of first planetary gears 98. The first sun gear 96 is fixed to the rotary shaft 51 of the motor 30 for coaxial rotation along with the rotary shaft 51. Each of the plurality of first planetary gears 98 is engaged with both of the first sun gear 96 and the first internal gear ring 101 and, therefore, can revolve around the first sun gear 96 when the rotary shaft 51 rotates. Each first planetary gear 98 is rotatably mounted to a first planetary carrier 105. Therefore, when revolving around the first sun gear 96, the first planetary gears 98 bring the first planetary carrier 105 to rotate.

The second stage planetary gear train includes a second sun gear 108, a plurality of second planetary gears 110 surrounding and engaged with the second sun gear 108, and a second internal gear ring 112 surrounding the plurality of second planetary gears 110. The second sun gear 108 is fixed to the first planetary carrier 105 for coaxial rotation with the first planetary carrier 105. Each of the plurality of second planetary gears 110 is engaged with both of the second sun gear 108 and the second internal gear ring 112 and, therefore, can revolve around the second sun gear 108 when the first planetary carrier 105 rotates. Each second planetary gear 110 is rotatably mounted to a second planetary carrier 114. Therefore, when revolving around the second sun gear 108, the second planetary gears 110 bring the second planetary carrier 114 to rotate. The output shaft 116 of the gearbox 90 is fixed to the second planetary carrier 114 for coaxial rotation with the second planetary carrier 114.

The two-stage planetary gear train is received within an outer housing 92 of the gearbox 90. The outer housing 92 is approximately a hollow cylindrical body with a bottom portion (referring to FIG. 9). The output shaft 116 of the gearbox 90 extends through the bottom portion of the outer housing 92 to an outside of the outer housing 92. Two axial positioning grooves 94 are defined in an inner surface of the outer housing 92. Two axial positioning protrusions 113 are formed on an outer periphery of the second internal gear ring 112. The positioning protrusions 113 may be engaged in the positioning grooves 94, such that the second internal gear ring 112 can be conveniently mounted in the outer housing 92, and rotation of the second internal gear ring 112 can be prevented. Two axial positioning protrusions 102 are formed on an outer periphery of the first internal gear ring 101. The positioning protrusions 102 may be engaged in the positioning grooves 94, such that the first internal gear ring 101 can be conveniently mounted in the outer housing 92, and rotation of the first internal gear ring 101 can be prevented.

Figure 7:
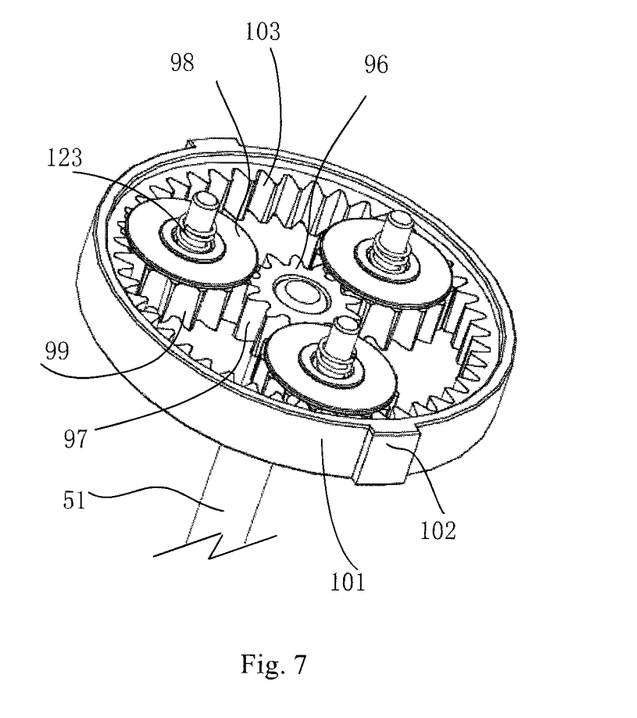
FIG. 7 illustrates a first stage speed reduction assembly of the gearbox of FIG. 5.
Figure 8:
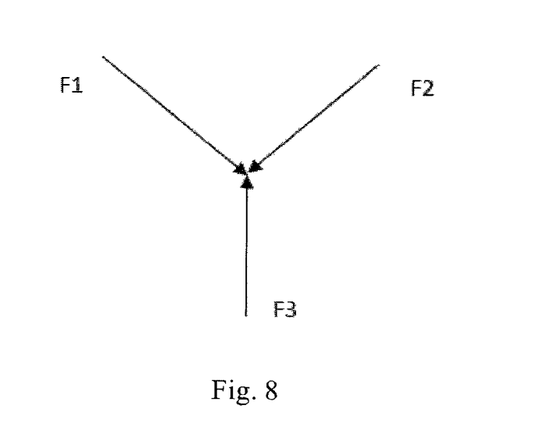
FIG. 8 illustrates the forces exerted on the sun gear of the first stage speed reduction assembly by planetary gears.

Referring to FIG. 7 and FIG. 8, teeth 97 of the first sun gear 96 each have a thickness progressively increasing in a direction close to the motor 30, such that a meshing plane of the first sun gear 96 is slanted with respect to the rotary shaft 51. Teeth 99 of the first planetary gears 98 each have a thickness progressively decreasing in the direction close to the motor 30. Teeth 103 of the internal gear ring 101 each have a thickness progressively increasing in the direction close to the motor 30. In this construction, during the course of meshing between the first sun gear 96 and the first planetary gears 98, the forces that the first planetary gears 98 exert on the first sun gear 96 are each split into a transverse component of force toward the rotary shaft 51 (the transverse component is perpendicular to the axial direction of the rotary shaft) and an axial component of force toward the motor. The transverse component of force achieves radially support to the first sun gear 96, and the axial component of force ensures stable meshing between the first sun gear 96 and the planetary gears 98. Therefore, in this embodiment, the rotary shaft 51 can be supported by the first sun gear 96 and, therefore, a traditional bearing is no longer needed. Preferably, the tooth thickness of the first sun gear 96 is in the range of 3 to 5 mm, and the meshing plane of the first sun gear 96 is inclined 3 to 8 degrees with respect to the rotary shaft 51. The first sun gear 96, the first planetary gears 98 and the first internal gear ring 101 are sequentially meshed and, therefore, they have the same tooth thickness and the same inclination angle of the meshing plane.

Preferably, the number of the first planetary gears is three. The first planetary gears 98 are equidistantly arranged along a circumferential direction of the first sun gear 96. The transverse components of force F1, F2, F3 (as shown in FIG. 8) that the first planetary gears 98 respectively exert on the first sun gear 96 are equal in size, and each transverse component of force points to an axis of the rotary shaft.

Figure 9:
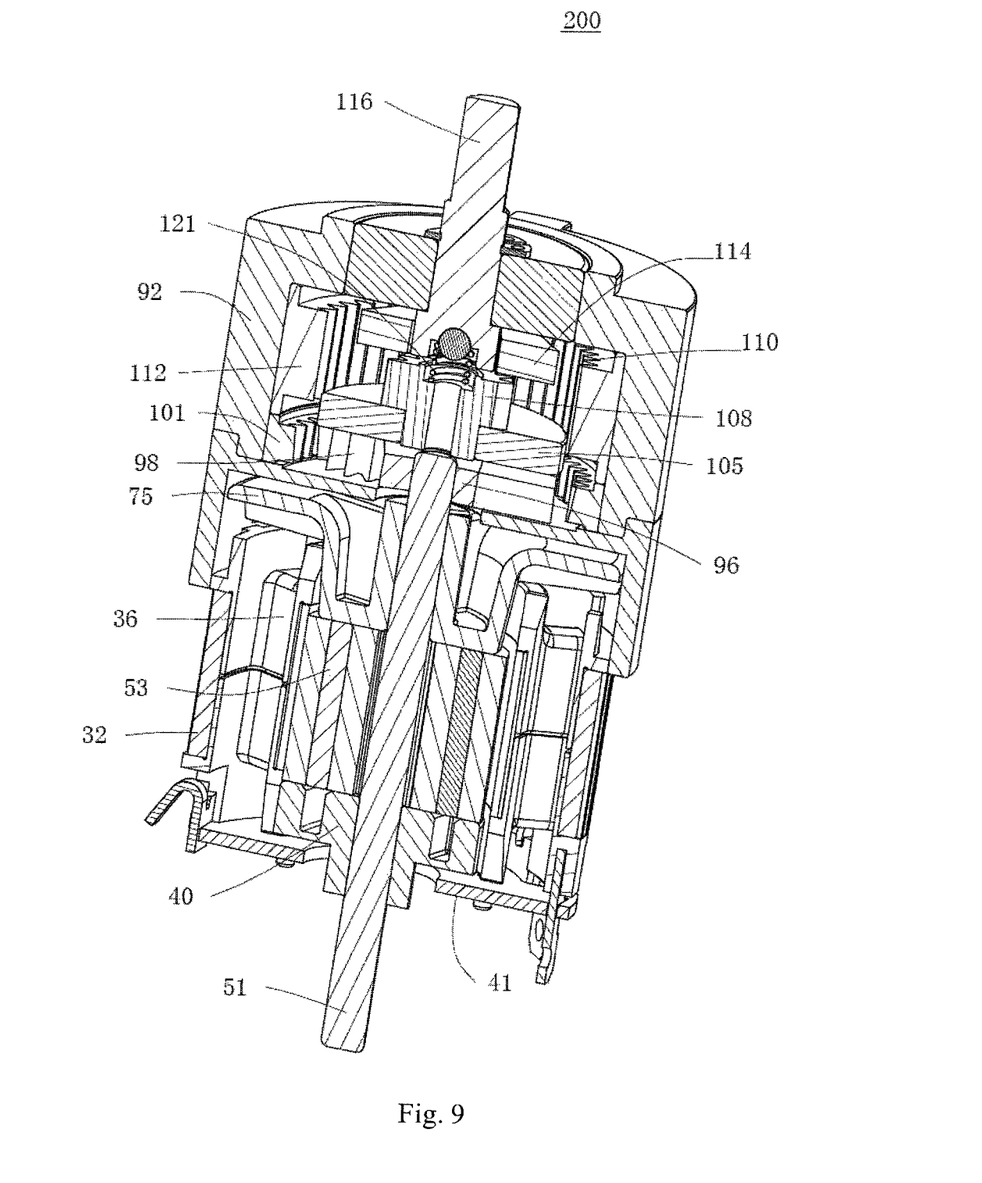
FIG. 9 is a sectional view of the driving device of FIG. 1.

Referring to FIG. 9, in this embodiment, the second sun gear 108 is subjected to a force that a first resilient member 121 exerts toward the motor 30. Since the second sun gear 108 is fixedly mounted to the first planetary carrier 105, the first planetary carrier 105 is indirectly subjected to the force and therefore exerts a force on the first planetary gears 98 toward the motor 30. The force exerted by the first planetary carrier 105 causes the first planetary gears 98 to exert the above mentioned transverse component of force toward the rotary shaft 51 and axial component of force toward the motor on the first sun gear 96 during the meshing process. The first resilient member 121 is a compression spring which is mounted between the second sun gear 108 and the output shaft 116. Since the output shaft 116 and the second planetary carrier 114 are fixed to form an integrated body, the first resilient member 121 can be considered mounted between the second sun gear 108 and the second planetary carrier 114. Preferably, the resilient force exerted by the first resilient member 121 is in the range between 7.5 N to 18 N.

Referring to FIG. 7, a second resilient member 123 may be further mounted between each first planetary gear 98 and the first planetary carrier 105. The second resilient member 123 is a compression spring 123 which exerts a force toward the motor 30 on the first planetary gear 98, thereby ensuring that each first planetary gear 98 exerts the axial component of force toward the motor 30 and the transverse component of force toward the rotary shaft 51 on the first sun gear 96 during the course of meshing between the first planetary gears 98 and the first sun gear 96. In this embodiment, the rotary shaft 51 is supported only by a bearing 40 (as shown in FIG. 9) and the first sun gear 96, and the bearing 40 is mounted at one end of the motor 30 away from the gearbox 90. Therefore, one less bearing is used than in the traditional design. Also because of this, one less end cap (which would be mounted to one end of the motor 30 facing the gearbox 50) is used than in the traditional design. Because one less bearing and one less end cap are used, the axial size of the driving device is effectively reduced which makes the driving device more compact.

Referring to FIG. 1 and FIG. 9, because the additional fan 75 is mounted to the driving device, a ventilation housing 72 may be formed or added accordingly. The ventilation housing 72 surrounds an outer side of the fan 75 and is fixed to the outer housing 92 of the gearbox 90. The ventilation housing 72 includes ventilation openings 74. The ventilation housing 72 and the outer housing 92 of the gearbox 90 are fixed together using axial pins. For example, the ventilation housing 72 and the outer housing 92 of the gearbox 90 are fixed to the motor 30 using axial pins. Specifically, the stator core 32 of the motor 30 includes two ribs 33 with through holes defined therein. The ventilation housing 72 also includes two ribs 73 with through holes defined therein. The outer housing 92 of the gearbox 90 also includes two ribs 93 with through holes defined therein. The ribs 33, 73, 93 are axially aligned such that the ventilation housing 72, the outer housing 92 and the stator core 32 can be fixed together with axial pins or other connecting members.

Alternatively, the fan 75 and the ventilation housing 72 may be omitted to make the structure of the driving device more compact.

Figure 10:
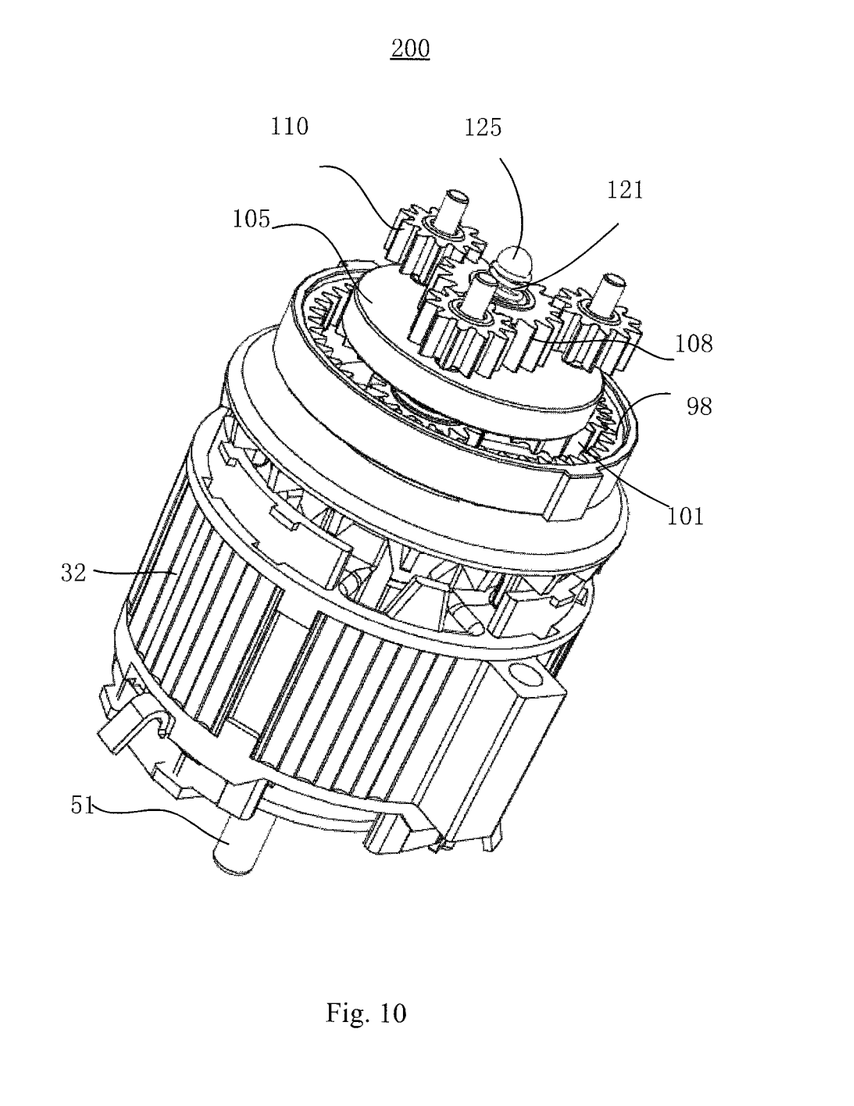
FIG. 10 illustrates a part of the structure of a driving device according to another embodiment of the present invention.

It should be understood that, referring to FIG. 9, there is a rotation speed difference between the parts that abut against two ends of the first resilient member 121. Therefore, the end portions of the first resilient member 121 may wear due to sliding friction. Referring to FIG. 10, in another embodiment, the first resilient member 121 is a compression spring, and one end of the compression spring may be mounted with a rolling ball 125 to reduce the wear on the end portion of the first spring member 121.

In one embodiment, both of the first resilient member 121 and the second resilient members 123 may be provided. In other embodiment, either the first resilient member 121 or the second resilient members 123 may be provided.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A driving device comprising:
a motor comprising a rotary shaft; and
a gearbox comprising:
a first sun gear coaxially fixed to the rotary shaft;
a plurality of first planetary gears surrounding and engaged with the first sun gear, meshing planes of the first sun gear and the first planetary gears being slanted with respect to the rotary shaft, each of the first planetary gears subjected to an externally-exerted first force and exerting a transverse component of force toward the rotary shaft on the first sun gear; and
a first internal gear ring surrounding and engaged with the plurality of first planetary gears,
wherein the first planetary gears are rotatably mounted to a first planetary carrier, the first planetary carrier is subjected to a second force that a first resilient member exerts toward the motor, and the first planetary carrier exerts the first force on the first planetary gears.

2. The driving device of claim 1, wherein the first resilient member is a compression spring, and at least one end of the compression spring is mounted with a rolling ball.

3. The driving device of claim 1, wherein a second resilient member is mounted between each of the first planetary gears and the first planetary carrier and is configured to generate a force acting on the first planetary gears.

4. The driving device of claim 1, wherein the first planetary gears are rotatably mounted to a first planetary carrier, a second resilient member is mounted between each of the first planetary gears and the first planetary carrier and is configured to generate the first force acting on the first planetary gears.

5. The driving device of claim 1, wherein teeth of the first sun gear have a thickness progressively increasing in a direction close to the motor to thereby cause the meshing plane of the first sun gear to be slanted with respect to the rotary shaft; teeth of the first planetary gears have a thickness progressively decreasing in a direction close to the motor; teeth of the first internal ring gear have a thickness progressively increasing in a direction close to the motor.

6. The driving device of claim 1, wherein the gearbox further comprises a second sun gear, a plurality of second planetary gears surrounding and engaged with the second sun gear, and a second internal gear ring surrounding and engaging with the second planetary gears, the second sun gear is coaxially fixed to the first planetary carrier, the second planetary gears are rotatably mounted to a second planetary carrier, and an output shaft of the gear box is coaxially fixed to the second planetary carrier.

7. The driving device of claim 6, wherein the first resilient member is a compression spring and is mounted between the second sun gear and one of the output shaft and second planetary carrier.

8. The driving device of claim 1, wherein the second force exerted by the first resilient member is in the range of 7.5 N to 18 N and is parallel to the rotary shaft.

9. The driving device of claim 1, wherein the first sun gear has a tooth thickness of 3 to 5 mm, and the meshing plane is inclined 3 to 8 degrees with respect to the rotary shaft.

10. The driving device of claim 1, wherein the first planetary gears are equidistantly spaced along a circumferential direction of the first sun gear, the transverse components of force that the first planetary gears respectively exert on the first sun gear toward the rotary shaft are equal in size, and the transverse component of force that each of the first planetary gears exerts on the first sun gear points to an axis of the rotary shaft.

11. A driving device comprising:
a motor comprising a rotary shaft; and
a gearbox comprising:
a first sun gear coaxially fixed to the rotary shaft;
a plurality of first planetary gears surrounding and engaged with the first sun gear, meshing planes of the first sun gear and the first planetary gears being slanted with respect to the rotary shaft, each of the first planetary gears subjected to an externally-exerted first force and exerting a transverse component of force toward the rotary shaft on the first sun gear; and
a first internal gear ring surrounding and engaged with the plurality of first planetary gears,
wherein the rotary shaft is supported only by a bearing and the first sun gear, and the bearing is mounted at one end of the motor away from the gearbox.

12. A driving device comprising:
a motor comprising a rotary shaft; and
a gearbox comprising:
a first sun gear coaxially fixed to the rotary shaft;
a plurality of first planetary gears surrounding and engaged with the first sun gear, meshing planes of the first sun gear and the first planetary gears being slanted with respect to the rotary shaft, each of the first planetary gears subjected to an externally-exerted first force and exerting a transverse component of force toward the rotary shaft on the first sun gear;
a first internal gear ring surrounding and engaged with the plurality of first planetary gears; and
a fan fixedly attached around the rotary shaft and located between the motor and the gearbox.

13. The driving device of claim 12, wherein the fan comprises a hub attached around the rotary shaft, a plurality of blades connected to the hub, and a panel connected to the blades, the panel substantially perpendicular to the rotary shaft and located between the blades and the gearbox.

14. The driving device of claim 12, wherein the fan comprises a hub attached around the rotary shaft and a plurality of blades connected to the hub; the rotary shaft is mounted to a rotor core, and the rotor core and the hub are connected together via a protrusion-groove engagement structure.

15. The driving device of claim 14, wherein the protrusion-groove engagement structure is formed by a plurality of protrusions formed on the hub and a plurality of grooves defined in the rotor core.

16. The driving device of claim 12, further comprising a ventilation housing, the ventilation housing surrounds an outer side of the fan and is fixed to an outer housing of the gearbox, and the ventilation housing defines a ventilation opening.

17. The driving device of claim 16, wherein the ventilation housing and the outer housing of the gearbox are fixed together through an axial pin or screw.

18. The driving device of claim 16, wherein the ventilation housing and the outer housing of the gearbox are fixed to the motor through an axial pin.

19. The driving device of claim 16, wherein the ventilation housing includes a rib formed on an outer periphery thereof, the outer housing of the gearbox also includes a rib formed on an outer periphery thereof, the rib of the ventilation housing and the rib of the outer housing are aligned with each other, and the rib of the ventilation housing and the rib of the outer housing are each formed with a through hole for insertion of the pin or screw therethrough.

* * * * *